Sept. 27, 1949.　　　A. L. CATFORD　　　2,483,180
VARIABLE SPEED GEAR
Filed Dec. 15, 1947　　　9 Sheets-Sheet 1
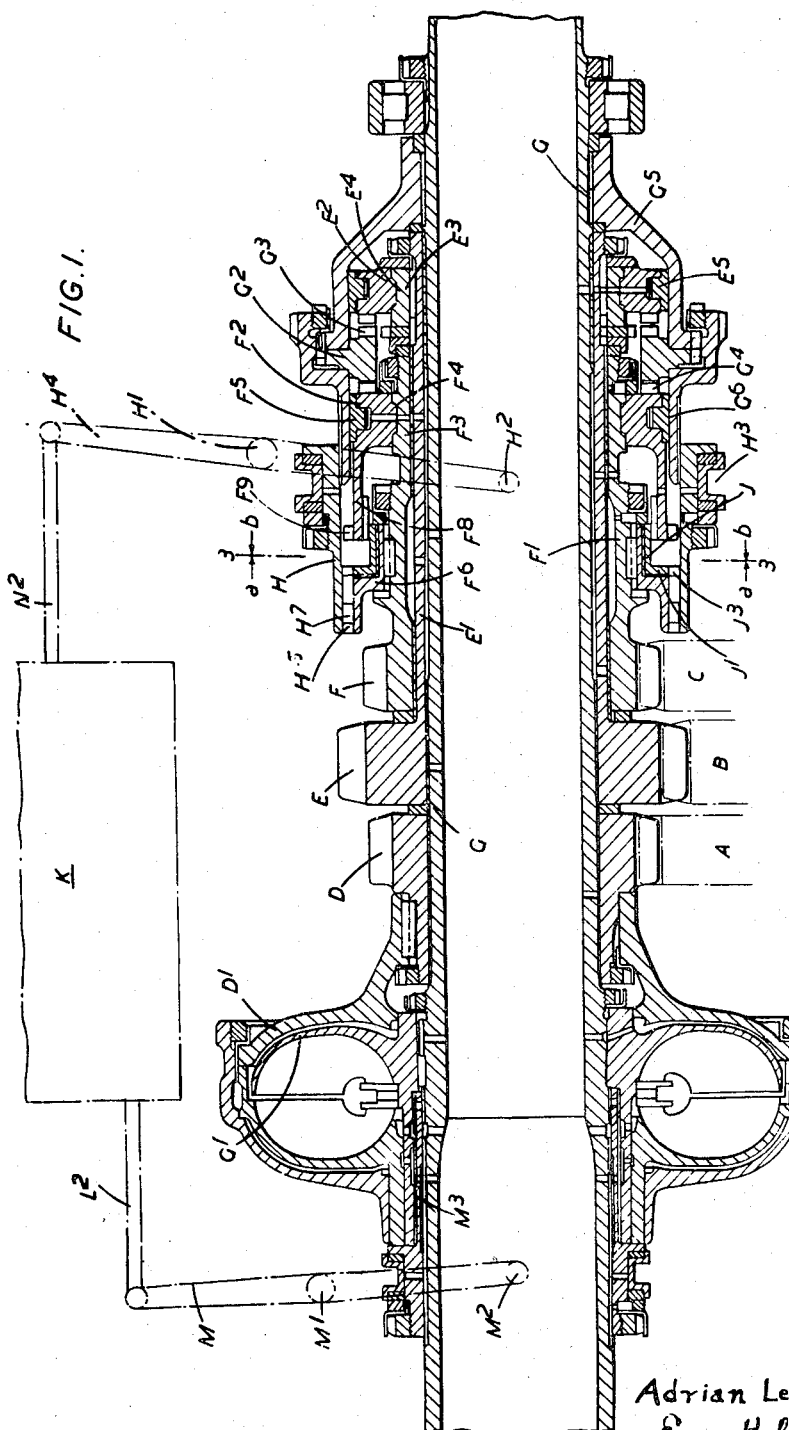
Inventor
Adrian Leslie Catford

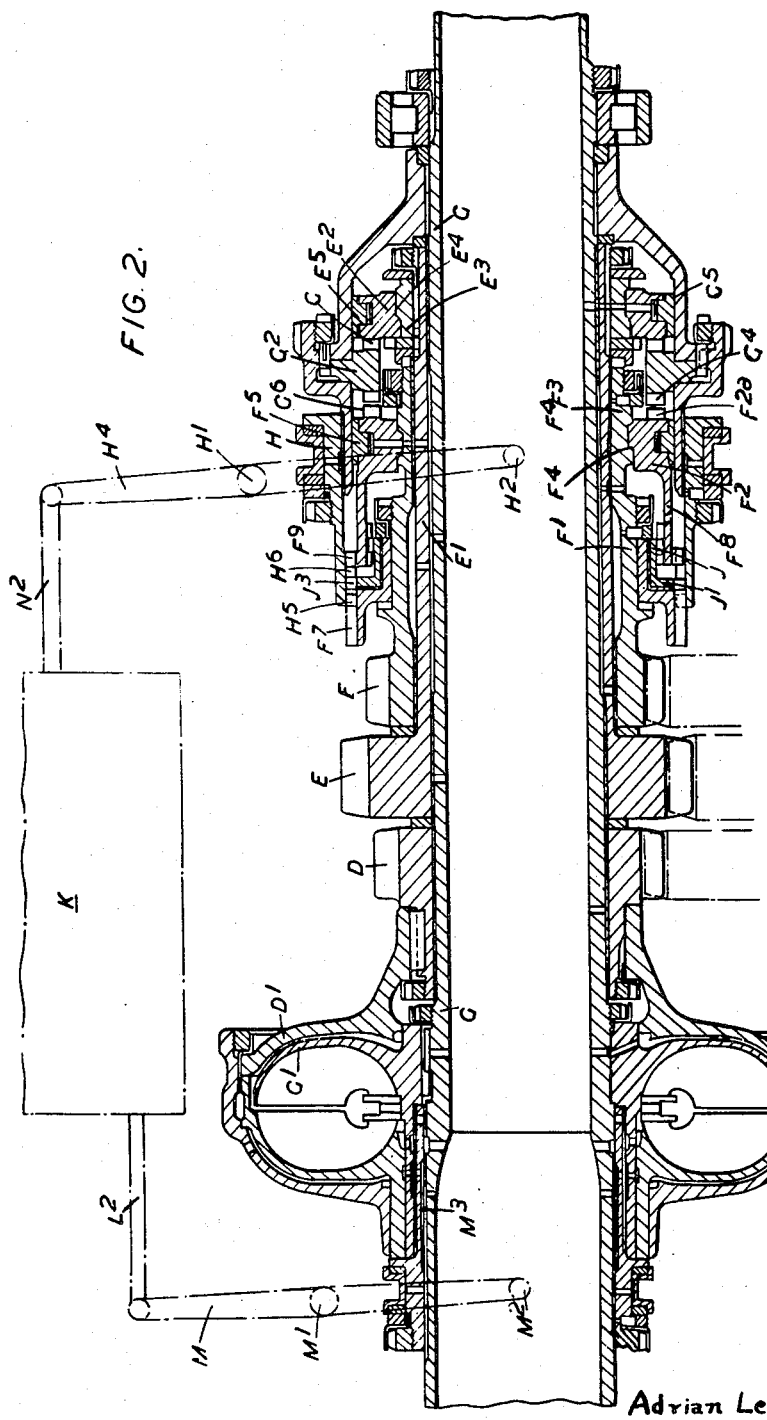

Sept. 27, 1949.  A. L. CATFORD  2,483,180
VARIABLE SPEED GEAR
Filed Dec. 15, 1947  9 Sheets-Sheet 3

Inventor
Adrian Leslie Catford
By Emery, Holcombe & Blair
Attorney

Inventor
Adrian Leslie Catford

Sept. 27, 1949.        A. L. CATFORD        2,483,180
VARIABLE SPEED GEAR
Filed Dec. 15, 1947        9 Sheets-Sheet 5
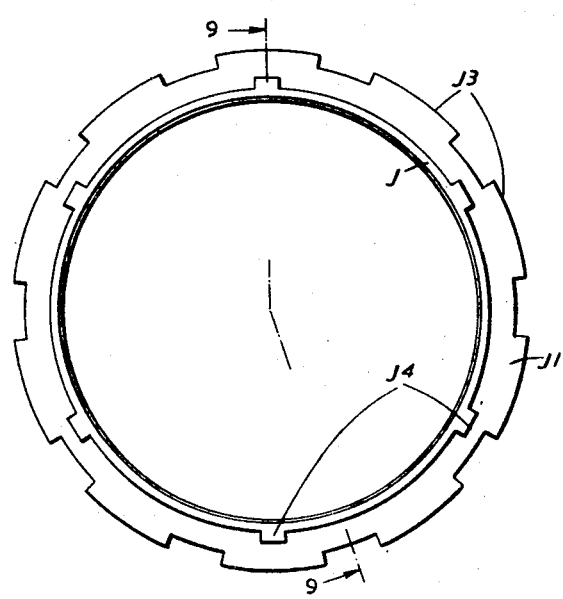
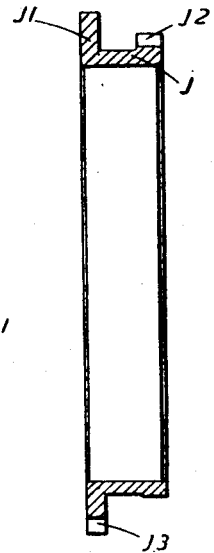
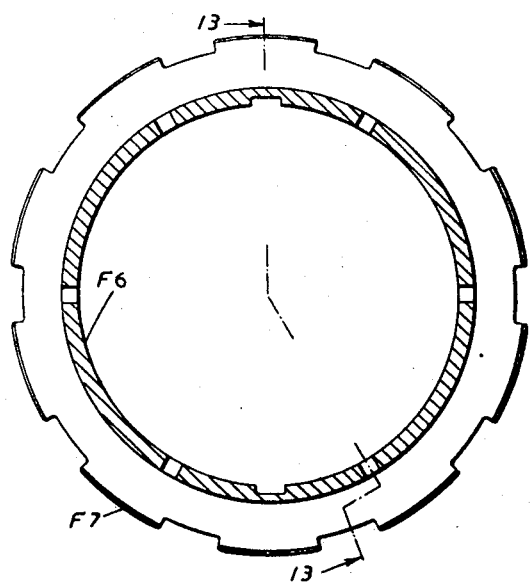
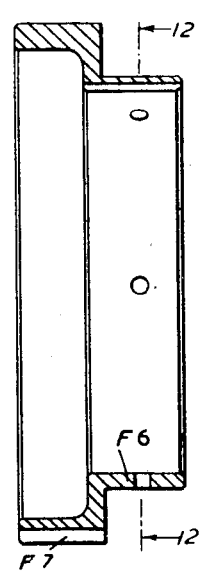
Inventor
Adrian Leslie Catford
By Emery, Holcombe & Blair
Attorney

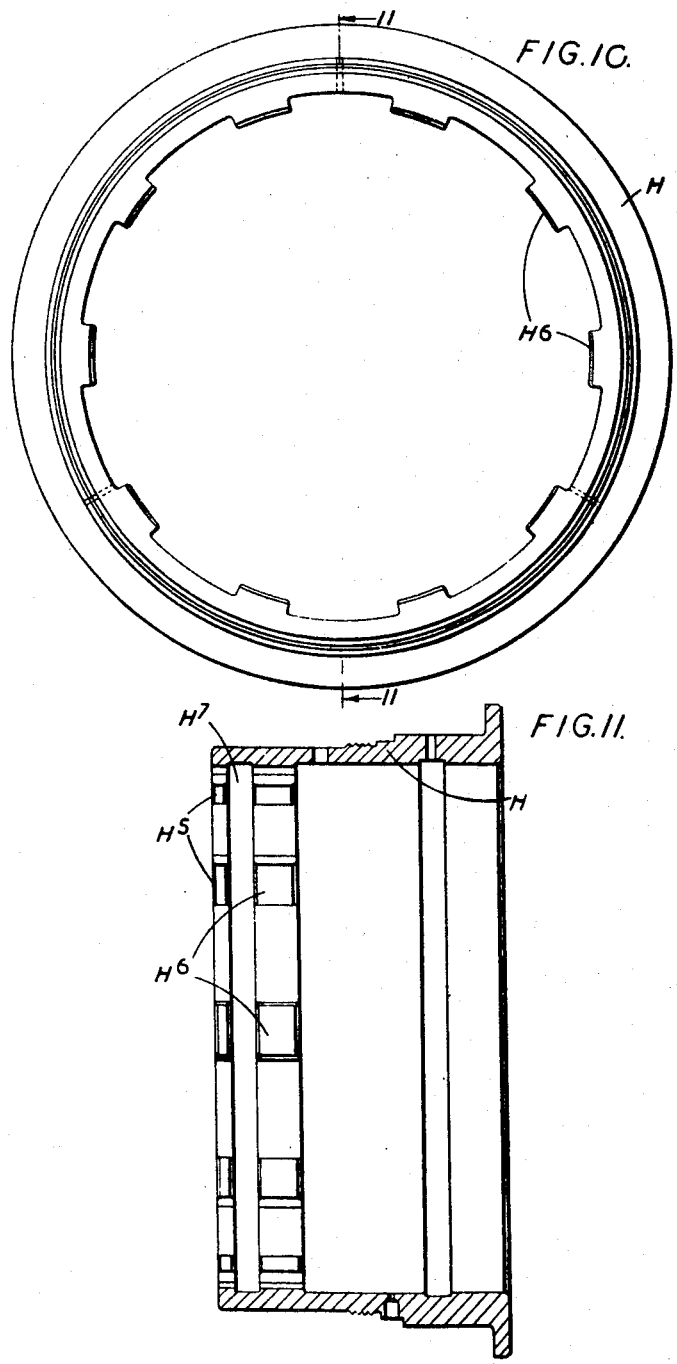

Sept. 27, 1949.  A. L. CATFORD  2,483,180
VARIABLE SPEED GEAR
Filed Dec. 15, 1947  9 Sheets-Sheet 7
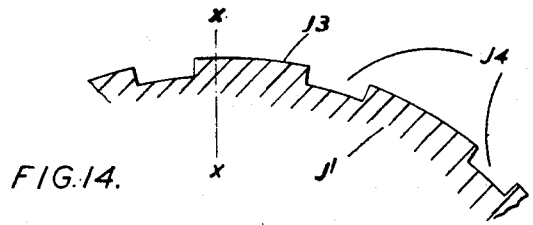
FIG. 14.
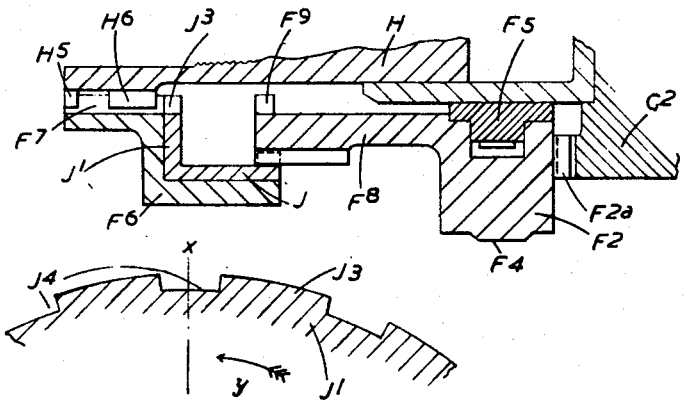
FIG. 15.
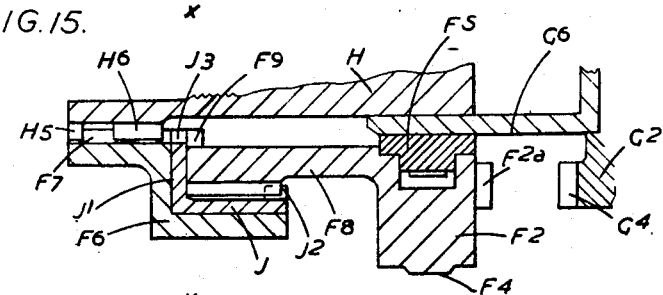
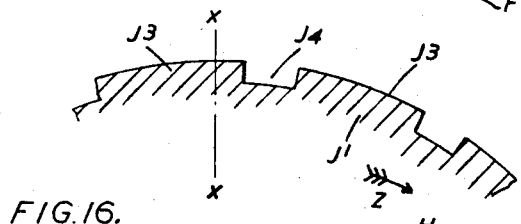
FIG. 16.
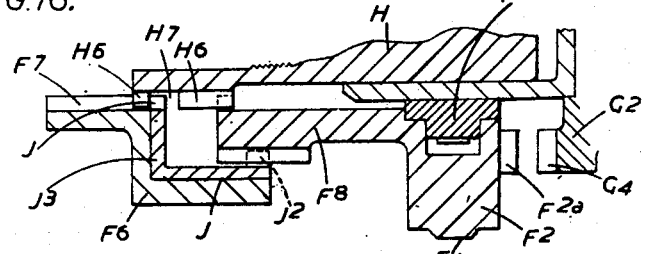
Inventor
Adrian Leslie Catford
Emery, Holcombe & Blair
Attorney Sept. 27, 1949.  A. L. CATFORD  2,483,180
VARIABLE SPEED GEAR Filed Dec. 15, 1947  9 Sheets-Sheet 8

Inventor
Adrian Leslie Catford
By Emery, Holcombe & Blau
Attorney

Sept. 27, 1949.  A. L. CATFORD  2,483,180
VARIABLE SPEED GEAR

Filed Dec. 15, 1947  9 Sheets-Sheet 9

Inventor
Adrian Leslie Catford
By Emery Holcombe & Blair
Attorney

Patented Sept. 27, 1949

2,483,180

UNITED STATES PATENT OFFICE 2,483,180

VARIABLE-SPEED GEAR

Adrian Leslie Catford, Hampton, England, assignor to D. Napier & Son Limited, London, England, a company of Great Britain Application December 15, 1947, Serial No. 791,807
In Great Britain December 16, 1946

4 Claims. (Cl. 74—732)

1

This invention relates to variable speed gears of the type in which gear wheels fast on a driving shaft are in constant mesh with gear wheels which are loose on a shaft which is to be driven and to which these loose wheels can be selectively connected by clutches, and has for its object to provide an automatic control for a two-speed gear constructed as described in the specification of the application for United States of America Letters Patent Serial No. 712,803, now Patent No. 2,467,108. While such a gear may be used for various purposes it is more especially intended for use in driving the impeller of a compressor which is employed for supercharging.

The object of the present invention is to prevent jamming of the teeth as may occur when a clutch member is disengaged or to be re-engaged.

According to this invention in a variable speed gear of the type indicated, a locking ring member is interposed between a sliding actuating sleeve and a clutch member through which a constant mesh gear wheel is coupled to the driven shaft, the locking ring being connected through splines to the clutch member but so as to permit relative axial movement, the clutch member having teeth adapted to be engaged by teeth in the actuating sleeve after the latter teeth have engaged and passed through teeth on the locking ring, and teeth in the actuating sleeve being in constant sliding engagement with teeth on a guide member which is connected to the said constant mesh gear wheel. The teeth on the locking ring are of double width in the circumferential direction with single tooth spaces between them, the teeth within the actuating sleeve are in two sets spaced apart in the axial direction with the dimensions in the axial direction of the teeth in one set greater than the similar dimensions of the teeth in the other set, while the teeth in both sets are of single width in the circumferential direction but with double tooth spaces between them. The teeth on the guide member with which teeth in the actuating sleeve are in constant sliding engagement are of double width in the circumferential direction with single tooth spaces between them, while the teeth on the clutch member which are adapted to be engaged by the teeth in the actuating sleeve are of single tooth width in the circumferential direction with double tooth spaces between them.

There is combined with the improved variable speed gear a hydraulic servomotor apparatus operative to bring about automatically a change in the gear ratio merely by the setting of a valve controlling the servomotor. This servomotor

2 apparatus comprises a first cylinder in which is a piston adapted to be moved in one direction by liquid under pressure and in the opposite direction by a spring, the piston being operative to control a fluid clutch serving to couple a gear wheel to the driven shaft in the variable speed gear. In a second cylinder is a piston adapted to be moved in one direction or the other by liquid under pressure and thereby position two valves connected to the piston and respectively controlling the flow of pressure liquid into and from the first cylinder, the piston in the second cylinder as it moves being also operative to effect the sliding of the actuating sleeve as required when a change in the gear ratio is to take place in the speed gear. A piston valve controls the flow of pressure liquid to and from the opposite sides of the piston in the second cylinder.

Owing to the structures of these different sets of teeth while one of the sets of teeth within the actuating sleeve remains constantly in mesh with the teeth on the actuating sleeve guide, the other set of teeth within the actuating sleeve cannot pass by the teeth of the locking ring and engage the teeth of the clutch member and so couple that member to the actuating sleeve guide until that clutch member is fully disengaged from the clutch member carried by the shaft. This will only occur when the driven shaft is rotated at the over-speed necessary to bring about a change in the gear ratio. Then when the speed of the driven shaft slows down again as the fluid clutch ceases to function, the clutch member will be caused to turn slightly on its helical splines and thus move slightly in the axial direction, and this means that it will have rotated slightly relatively to the actuating sleeve guide. It then becomes impossible for the actuating sleeve to be moved out of engagement with the clutch member owing to the teeth of the locking ring lying in the gap between the sets of teeth within the actuating sleeve and in the fact that in their rotational positions the opposed sets of teeth on the locking ring and in the actuating sleeve do not register. This prevents the actuating sleeve from being moved so as to release the clutch member when re-engagement of this clutch member is desired until the driven shaft has once more been rotated at its over-speed so as to cause the clutch member to move in the axial direction. The clutch member associated with this mechanism is that which is connected through helical splines to the sleeve on which is mounted the gear wheel of the higher gear ratio and on this gear wheel sleeve is fixed the actuating sleeve guide above mentioned.

The accompanying drawings illustrate by way of example a two-speed gear of the type described and shown in the specification and drawings of the above-mentioned patent application Serial No. 712,803 with the present invention embodied therein. In these drawings, Figure 1 is a longitudinal sectional elevation of the improved two-speed gear in which the parts are shown as when the higher gear ratio is engaged.

Figure 2 is a view similar to Figure 1 but showing the parts as when the lower gear ratio is engaged.

The following Figures Nos. 5 to 13 inclusive show the parts indicated on an enlarged scale.

Figure 4:
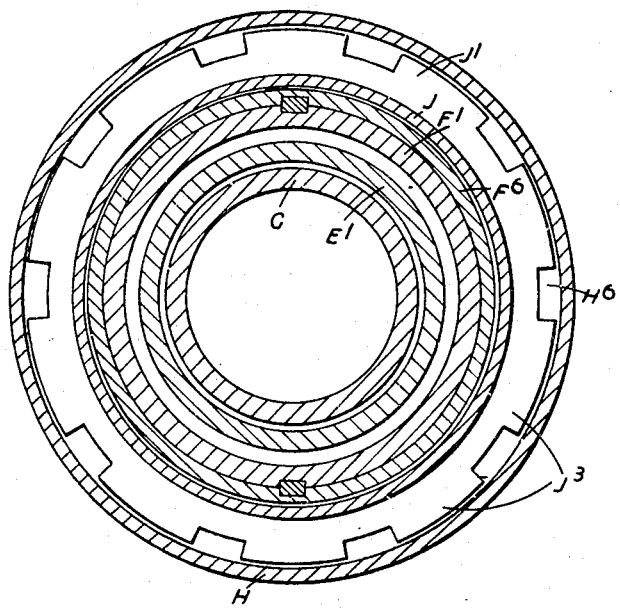
Figure 4 is a transverse section on the same line 3—3 in Figure 1 but looking to the left in that figure in the direction indicated by the arrows $b$ to the right in that figure.
Figure 3:
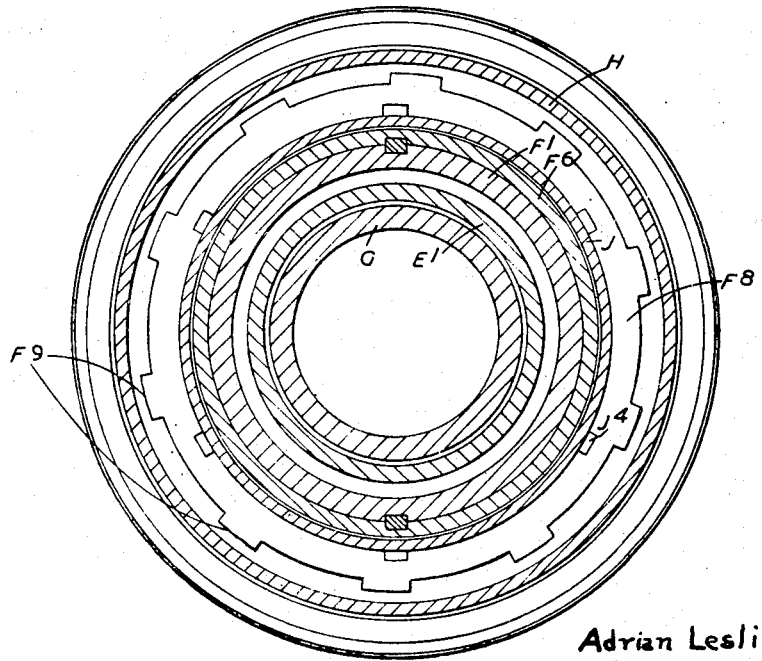
Figure 3 is a transverse section on the line 3—3 in Figure 1 on an enlarged scale and when looking as indicated by the arrows $a$ to the right in that figure.
Figure 5:
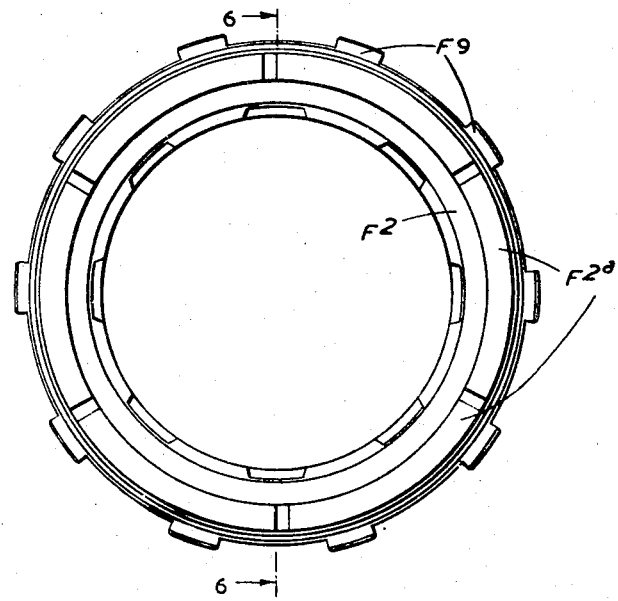

Figure 5 is a face view of the movable clutch member associated with the gear wheel of the higher gear ratio.

Figure 6:
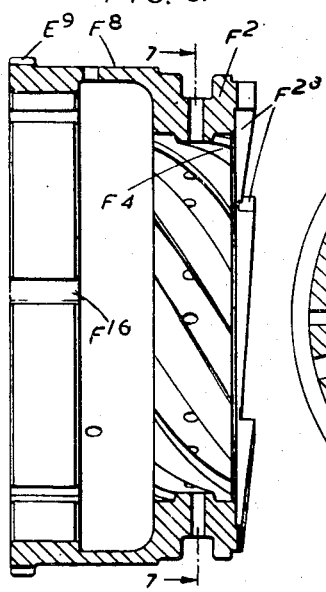

Figure 6 is a section of this clutch member on the line 6—6 in Figure 5, that is in a plane containing the gear axis.

Figure 7:
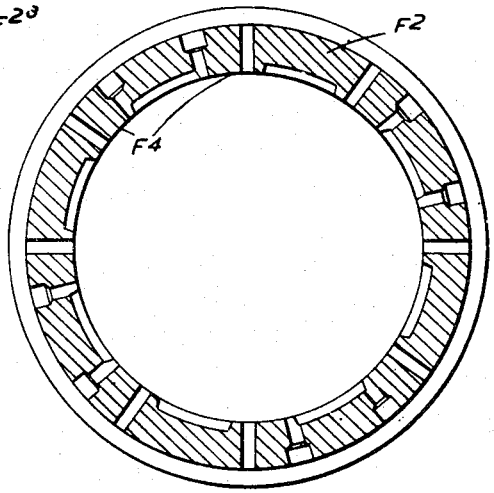

Figure 7 is a transverse section on the line 7—7 in Figure 6:

Figure 8 is a face view of the part hereinafter referred to as the locking ring.

Figure 9 is a section on the broken line 9—9 in Figure 8.

Figure 10 is a face view of the part hereinafter referred to as the actuating sleeve.

Figure 11 is a section on the line 11—11 in Figure 10, this section passing through the axis of the gear.

Figure 12 is a section of the part hereinafter referred to as the actuating sleeve guide, the section being on the line 12—12 in Figure 13 looking in the direction of the arrows.

Figure 13 is a section on the broken line 13—13 in Figure 12 looking in the direction of the arrows.

Figures 14, 15 and 16 show on a considerably enlarged scale parts of the mechanism seen in Figures 1 and 2. In each of these figures there is shown somewhat diagrammatically in the lower view the locking ring and parts immediately associated therewith as seen in longitudinal section in Figures 1 and 2, while in the upper portion of the figure there is shown in face view, as in Figure 8, a part of the locking ring. In Figure 14 the parts in the lower view are seen in the positions which they occupy when the higher gear ratio is in operation, while in the upper view a rotational position of the locking ring is indicated. In Figure 15 the lower view shows the parts in the positions which they occupy while the overspeed drive of the shaft is taking place, and in the upper view the change at that time in the rotational position of the locking ring is indicated. Similarly in Figure 16 in the lower view the parts are seen in the positions which they occupy when the low gear ratio is in operation while the upper view indicates the corresponding rotational position of the locking ring.

Figure 17:
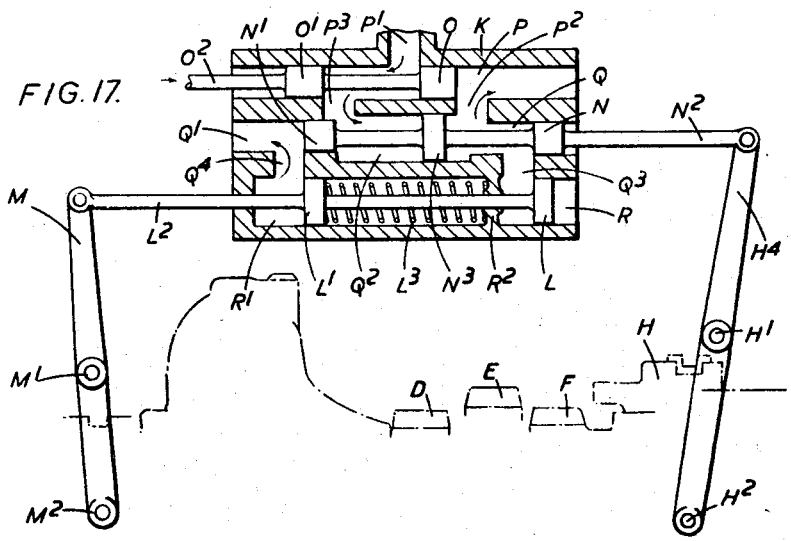

Figure 17 is a diagrammatic longitudinal sectional elevation of the hydraulic servomotor apparatus by means of which the gear changes are effected, the parts of the apparatus being here shown in their positions when the higher gear is engaged as shown in Figure 1.

Figure 18:
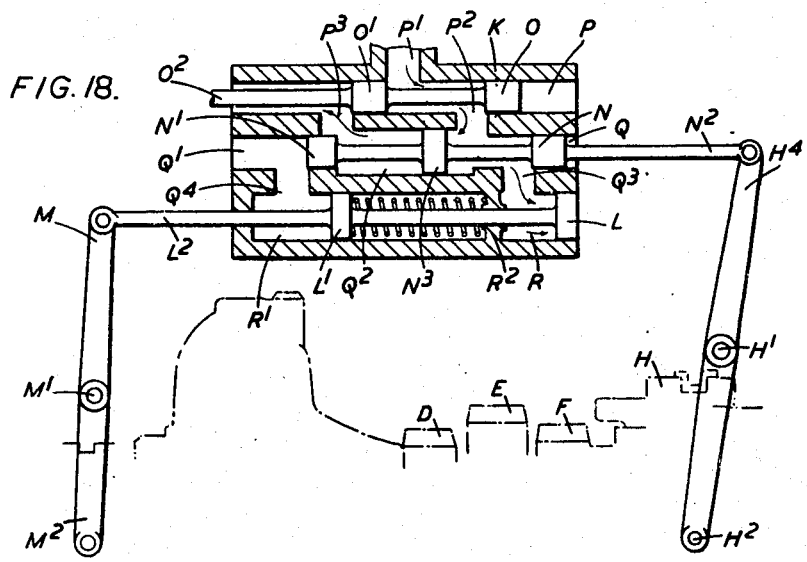

Figure 18 is a view similar to Figure 14 but showing the parts in their respective positions when a change from low gear to the higher gear ratio is to take place.

Figure 19 is again a view similar to Figures 17 and 18 but showing the parts in the positions into which they move when the lower gear ratio is engaged.

A two-speed gear of the type indicated and to which the present invention is more especially applicable comprises in combination the following features. Fixed on a driving shaft not shown in the drawings, are three gear wheels indicated at A, B and C and these wheels are in constant mesh with three gear wheels D, E and F all loose on the shaft G which is to be driven at one or the other of two different speeds. The wheel D is connected to one part $D^1$ of a fluid coupling of which the other part $G^1$ is carried by the shaft G. The wheel E through which the shaft G is driven at the lower gear ratio is mounted on one end of a sleeve $E^1$ rotatable on the shaft G, and the wheel F through which the shaft G is driven at the higher gear ratio is carried on one end of a sleeve $F^1$ freely rotatable on the sleeve $E^1$.

The shaft G carries a clutch member $G^2$ provided with dog teeth $G^3$ $G^4$ which are on opposite sides of the member $G^2$ and face in opposite directions. The clutch teeth $G^3$ are adapted to be engaged by teeth on the side of a clutch member $E^2$ which can move in the axial direction on a part $E^3$ at the end of the sleeve $E^1$ the movement being effected by a quick pitch thread at $E^4$ where the clutch member $E^2$ and the end of the sleeve interengage. This movement will cause the teeth $G^3$ of the clutch member $G^2$ on the shaft G to engage with or be disengaged from the teeth of the clutch member $E^2$ and thus couple the gear wheel E to the shaft G or disconnect it when the higher gear ratio is required. Similarly the sleeve $F^1$ on which is the gear wheel F carries a clutch member $F^2$ having at the side adjacent to the clutch member $G^2$ teeth $F^{2a}$ adapted to engage the dog teeth $G^4$, the movement of the clutch member $F^2$ on the part $F^3$ to effect this or to disengage these teeth being obtained by a quick pitch thread at $F^4$ where the parts $F^2$ and $F^3$ interengage. When the teeth $F^{2a}$ of the clutch member $F^2$ are engaged with the teeth $G^4$ the gear wheel F will be connected to the shaft G. The casing $G^5$ which is mounted on the shaft G and carries within it the clutch member $G^2$ has also within it and on opposite sides of the clutch member surfaces with which members $E^5$ and $F^5$ are in frictional contact these members $E^5$ and $F^5$ being respectively carried by and in frictional engagement with the clutch members $E^2$ and $F^2$. It is the friction between these parts which when a gear change is to be effected causes the relative rotation between the clutch members $E^2$ and $F^2$ and the parts $E^3$ and $F^3$ of the sleeves $E^1$ and $F^1$ this relative rotation bringing about the movement in the axial direction of the clutch members $E^2$ and $F^2$ owing to the quick pitch threads at $E^4$ and $F^4$.

The fluid flywheel $G^1$ $D^1$ acting as a clutch can be rendered inoperative or operative to connect the gear wheel D to the shaft G. When thus connected the shaft G will be rotated at a speed rather greater than it will be rotated through the higher gear ratio wheels C F. This over speed driving of the shaft G acts through the friction members $E^5$ and $F^6$ on the clutch members $E^2$ and $F^2$ causing them to turn relatively to the sleeves $E^1$ and $F^1$ with the result that the clutches $E^2$ and $F^2$ will respectively be disengaged from the clutch member $G^2$. When the clutch member $F^2$ has been caused to move in the axial direction so as to disengage it from the clutch teeth $G^4$ means are provided for maintaining the clutch member $F^2$ in the position with its teeth thus disengaged. The present invention is especially associated with this arrangement and is designed to enable the operation of the parts to be effected smoothly and without risk of jamming of the teeth.

The sleeve $F^1$ carries connected to it by splines a part $F^6$ provided externally with teeth $F^7$ (see Figures 12 and 13). There is a sleeve-like extension $F^8$ from the clutch member $F^2$ and on the exterior of this extension are teeth $F^9$ (see Figures 5, 6 and 7). Mounted so that it can slide on a part $G^6$ of the casing $G^5$ is a part H to be referred to as an actuating sleeve (see Figures 10 and 11). Sliding of this sleeve can be effected by means to be described hereunder through movement of a lever pivoted at $H^1$, the end $H^2$ of one arm of this lever engaging a collar $H^3$ on the sleeve H. Movement is imparted to the other arm $H^4$ of this lever hydraulically when a change in the gear ratio is to be effected. Within the sleeve H is a double set of teeth $H^5$ $H^6$, the two sets being spaced apart in the axial direction with a gap $H^7$ between them. The teeth $H^5$ engage the teeth $F^7$ on the exterior of the part $F^6$ carried by the sleeve $F^1$. The interengagement of these teeth $H^5$ and $F^7$ enables the sleeve H to be moved in the axial direction while being rotated with the sleeve $F^1$ when this sleeve and the gear wheel F are coupled through the clutch member $G^2$ to the shaft G. The part $F^6$ may be referred to as the actuating sleeve guide.

A locking ring J, $J^1$ (see Figures 8 and 9) which constitutes the main feature of the present improvement, is interposed between the extension $F^8$ of the clutch member $F^2$ and the actuating sleeve guide $F^6$. This locking ring J $J^1$ can rotate on the part $F^6$ but cannot move thereon in the axial direction. Splines $F^{10}$ within the clutch member extension $F^8$ engage splines $J^2$ on the cylindrical part J of the locking ring so that this ring will always rotate when the clutch member $F^2$ is coupled to the shaft G, but the connection between the part $F^8$ and the locking ring J permits movement of the clutch member $F^2$ in the axial direction and relatively to the locking ring. This ring, as can be seen in Figures 1 and 2, is L-shaped in cross-section and the radially projecting part $J^1$ has its end teeth $J^3$ which can be engaged by the second set of teeth $H^6$ within the actuating sleeve H. As described above the clutch member $F^2$ will move in the axial direction on the sleeve $F^1$ when relative rotation between these parts takes place and the clutch member is to be disengaged from the clutch member $G^2$. When the clutch member $F^2$ so moves, to the left as seen in Figures 1 and 2, it will be locked through the ring J $J^1$ to the sleeve $F^1$ and relative movement between these parts will be temporarily prevented. This locking will take place as a result of moving the actuating sleeve H to the right as seen in Figures 1 and 2 into the position shown in Figure 2, the teeth $H^6$ first engaging the teeth $J^3$ on the locking ring and then passing through these teeth and engaging the teeth $F^9$ on the clutch member extension $F^8$.

The particular formations of the teeth $J^3$ on the locking ring J $J^1$, the teeth $H^5$ $H^6$ within the actuating sleeve H, the teeth $F^7$ on the actuating sleeve guide $F^6$ and the teeth $F^9$ on the extension $F^8$ from the clutch member $F^2$, are such as to ensure engagment of the teeth $H^6$ with the teeth $F^9$ of the clutch member without risk of jamming. The teeth $J^3$ (see Figures 8 and 9) on the locking ring J $J^1$ are of double width in the circumferential direction with single tooth spaces between them. Splines $J^4$ connect this ring to the extension $F^8$ from the clutch member $F^2$ so that the ring will rotate with the clutch member but the latter can move relatively to the ring in the axial direction. The teeth $H^5$ $H^6$ (see Figures 10 and 11) in the two sets within the actuating sleeve H are similar in that the teeth in each set are of single width in the circumferential direction but with double-tooth spaces between them. As seen, however, in Figure 11 the teeth $H^6$ are wider in the axial direction than the teeth $H^5$. The teeth $F^7$ (see Figures 12 and 13) on the exterior of the actuating sleeve guide $F^6$ are of double width in the circumferential direction with single-tooth spaces between them. The teeth $F^9$ on the extension of the clutch member $F^2$ (see Figures 5, 6 and 7) are of single tooth width in the circumferential direction with double-tooth spaces between them and the splines $F^{10}$ within the part $F^8$ engage the splines $J^4$ on the locking ring.

The details of the four parts, namely the clutch member $F^2$, the locking ring J $J^1$, the actuating sleeve H and the actuating sleeve guide $F^6$ are all to be seen clearly in the enlarged views Figures 5 to 13. From these figures and Figures 1 and 2 it will be understood that as the actuating sleeve is moved to the right, as it is seen in Figures 1 and 2, in order to hold the clutch member $F^2$ out of engagement with the clutch member $G^2$, the wide teeth $H^6$ in the actuating sleeve can only pass through the teeth $J^3$ in the locking ring and engage the teeth $F^9$ on the clutch member $F^2$ when this latter member is fully disengaged from the clutch member $G^2$. This condition can only be reached when the shaft G is driven at overspeed through the gear D after this has been coupled to the shaft by the fluid flywheel $D^1$ $G^1$.

If both sets of teeth $H^5$ $H^6$ in the actuating sleeve H are engaging the teeth F on the actuating sleeve guide $F^6$ and they are clear of the teeth $J^3$ on the locking ring J, then the clutch member $F^2$ is free for its teeth $F^{2a}$ to engage the teeth $G^4$ of the clutch member $G^2$. But if the teeth $H^6$ have passed through the spaces between the teeth $J^3$ of the locking ring and are in engagement with the teeth $F^9$ on the clutch member $F^2$ then since both the teeth $H^6$ and the teeth $F^9$ are of single tooth width in the circumferential direction but have double tooth spaces between them, this has the effect of backlash which permits the clutch member $F^2$ to turn on the part $F^3$ only far enough to allow the actuating sleeve H to slide into its locking position, but the clutch member cannot then turn sufficiently to give it the axial movement necessary to cause its teeth $F^{2a}$ to engage the teeth $G^4$. When the clutch member $F^2$ is restrained in this position by the teeth of the actuating sleeve, the teeth of the clutch member $E^2$ will engage the teeth $G^3$ as the speed of the shaft G drops following disengagement of the fluid coupling.

This arrangement prevents sliding of the actuating sleeve H until, when the higher gear ratio is required, the shaft G is driven at the overspeed by causing the fluid flywheel $D^1$ $G^1$ to couple the gear wheel D to the shaft. Thus the locking ring J J¹ prevents sliding of the actuating sleeve in either direction that is to engage its teeth H⁶ with the teeth F⁹ of the clutch member F² or to disengage these teeth after their engagement, until the shaft G is driven at the over-speed.

Figure 19:
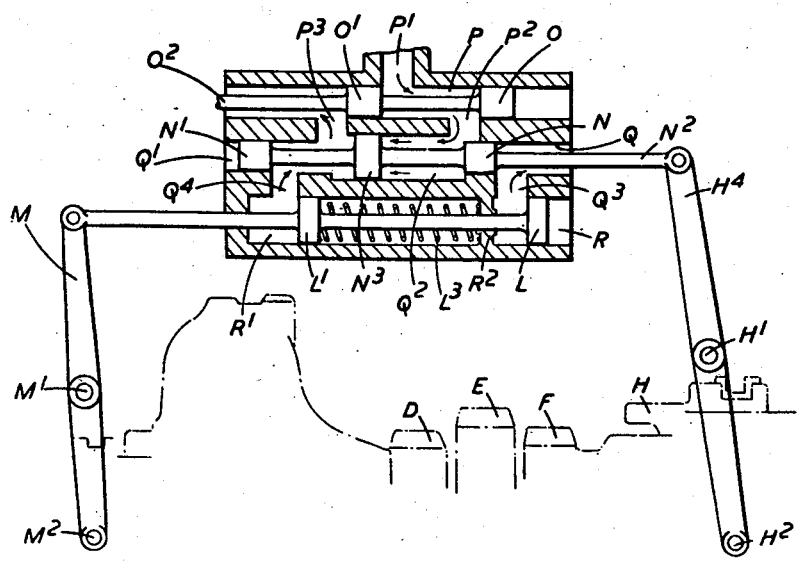

The gear change is controlled by hydraulic servomotor apparatus illustrated in Figures 17, 18 and 19 and comprising the following parts. In a cylinder formed in part of a casing K there are two pistons L L¹ mounted on a rod L², the piston L being adapted to be acted on and moved in one direction (to the right as seen in Figures 17, 18 and 19) by fluid pressure while the other piston L¹ can be moved in the opposite direction by a spring L³. The rod L² is connected to one arm M of a lever pivoted at M¹ and having its other arm M² connected to a sleeve M³ which controls the filling or emptying of the fluid flywheel D¹ G¹. This control is in a known manner and movement of the sleeve M³ on the shaft G determines the flow of liquid into the fluid flywheel. This liquid is constantly allowed to leak away so that it is only when the inflow exceeds the outflow that the device will function as a clutch and serve to couple the gear wheel D to the shaft G in order that that shaft may be driven at the over-speed necessary to bring about a change in the gear ratio.

In a second cylinder formed in the casing K are two pistons N N¹ spaced apart along a rod N² and functioning in effect as valves, with a third piston N³ on each side of which pressure liquid can act and move both the piston N³ and the valves N N¹ in one direction or the other. The rod N² is connected to the end of the lever arm H⁴ through which sliding movement can be imparted to the actuating sleeve H. Fluid under pressure acting on the piston N³ will swing the lever H in one direction or the other. In a third cylinder formed in the casing K are the two parts O O¹ of a piston valve spaced apart along a rod O² through which this valve can be moved. The piston valve O O¹ moves in a cylinder P into which liquid under pressure can enter through the port P¹ and flow from the cylinder P through ports P² P³ into the second cylinder. This has end portions Q Q¹ in which lie and move the valves N N¹, and a central part Q² of rather larger diameter in which moves the piston N³. The end parts R R¹ of the first cylinder in which lie the pistons L L¹ are separated from each other by the partition R² which serves as an abutment for one end of the spring L² whose opposite end acts on the piston L¹. Pressure liquid passing through the ports P² P³, according to the positioning of the piston valve O O¹, will enter one end or the other of the cylinder part Q² and there act on one side or the other of the piston N³. This will move the valves N N¹ and either permit pressure liquid to flow through the port Q³ into the cylinder part R and there act on the piston L, or will open the cylinder R to exhaust through the end of the cylinder Q and allow the spring L³ to move the rod L² and pistons L L¹.

The piston valve O O¹ through the rod O² can be actuated manually or otherwise and can be set according as it is desired to employ the higher or the lower gear ratio for driving the shaft G and the impeller which may be mounted on it. Liquid under pressure can flow away respectively from the end of the cylinder P beyond the part O of the piston valve and similarly from the ends of the cylinder Q Q¹ beyond the valves N N¹.

When a change in the gear ratio takes place the mechanism as controlled by the servomotor operates in the following way. To prevent misunderstanding it may be convenient to restate what the drawings show as to the stages in the gear changing process. Thus Figure 1 shows the parts in their respective positions when the higher gear ratio is in operation, while Figure 2 shows them when the lower gear ratio is in use. Figure 14 shows the locking ring J J¹ and associated parts on an enlarged scale in their positions as they are seen in Figure 1. Figure 15 shows the same parts in the positions into which they first move when the shaft G is driven at the over-speed as a preliminary to a change in the gear ratio. Figure 16 shows the parts in their respective positions when the change in the gear is completed and the lower gear ratio is in operation. Figure 17 illustrates the positions of the parts in the servomotor as when a change in the gear has taken place and the higher gear ratio is in operation as shown in Figure 1. Figure 18 shows the first stage in the operation of the servomotor when a change is to be made from the higher gear ratio to the lower gear ratio. Finally Figure 19 shows the parts as at the conclusion of the gear change and when the lower gear ratio is in use. It may be noted that during this change and similarly when there is to be a change back to the higher gear ratio the parts of the servomotor assume various intermediate relative positions as they perform their respective functions as will be explained hereunder.

It will be convenient to commence with the assumption that the higher gear ratio is in use and the parts of the mechanism are therefore as shown in Figure 1 with the fluid flywheel empty, the teeth F²ᵃ of the clutch member F² in engagement with the teeth G⁴ of the shaft clutch member G², and the teeth of the clutch member E² disengaged from the teeth G³ of the shaft clutch member.

In the servomotor the valve O O¹ is moved from the position in which it is shown in Figure 17 into the position in which it is seen in Figure 18. This opens the port P² and allows pressure liquid to flow through the cylinder Q and through the port Q³ into the cylinder R and there act on the piston L which is moved against the spring L³ to the right, as seen in these figures, and into the position in which it is shown in Figure 18. Acting through the lever M the piston L moves the sleeve valve M³ so as to admit liquid to the fluid flywheel D¹ G¹ whereby the gear wheel D is coupled to the shaft G which will then be driven at the over-speed, that is a speed somewhat greater than the speed at which the shaft is driven through the higher gear ratio wheel F. All the parts in the servomotor are now in the positions in which they are seen in Figure 18. Though the pressure liquid in the cylinder Q is now acting on the adjacent face of the piston N³ it cannot move this piston and the lever H⁴ and the actuating sleeve H because the teeth J³ of the locking ring J J¹ then lie in the annular space H⁷ between the teeth H⁵ and H⁶ and the teeth J³ lie in the path of the teeth H⁶ if an attempt is made to move the sleeve H and the teeth H⁶ in the axial direction, that is to the right, as these parts are seen in Figures 1 and 14. In Figure 14 the position of the teeth H⁶ relatively to the teeth J³ is indicated by the radial plane x—x in the upper view in Figure 14 each tooth H⁶ lying in such a plane and thus behind a part of a double width tooth J³.

The effect of driving the shaft G at the over-speed is to cause the clutch member F² to turn on the part F³ of the sleeve F¹ and move to the left, as seen in Figure 1, owing to the action of the friction member F⁵. This is to some extent assisted by the formation of the teeth F²ᵃ as seen in Figure 6 which are this withdrawn from engagement with the teeth G⁴ of the shaft clutch member G². The rotation of the clutch member on the sleeve F¹ as the teeth are disengaged necessarily causes the locking ring J to be turned on the guide member F⁶ in the direction indicated by the arrow y in the upper view Figure 15 and therefore relatively to the sleeve H and its teeth H⁶ each of which now lies in a radial plane such as x—x and as indicated in Figure 15 each tooth H⁶ is now opposite to a space J⁴ between two of the locking ring teeth J³. The parts at this time are in the positions in which they are seen in Figure 15. The gaps J⁴ between the teeth J³ may be referred to as constituting a "gate" through which the teeth H⁶ must pass when the sleeve H is moved to the right (Figure 1) as it now can be by the action of the pressure liquid on the piston N³ since this "gate" has been opened. Actually the parts are only for a short time in the positions in which they appear in Figures 15 and 18. The movement of the piston N³ to the left as it moves the sleeve H has moved the valve N over the port Q³ and into the position in which it is seen in Figure 19 where the flow of pressure liquid to the cylinder R has been cut off and that cylinder opened to exhaust. The piston L and lever M are then free to be moved by the spring L³ and slide the sleeve valve M³ so as to allow the liquid to flow from the fluid flywheel disconnecting the shaft G from the over-speed gear wheel D. The speed of the shaft G will now drop and as this is happening the friction member F⁵ acting on the clutch member F² will cause this clutch member to turn back again and move somewhat to the right on the sleeve F¹ but not enough to bring the teeth F²ᵃ into engagement with the teeth G⁴. This partial rotation on the clutch member F² on the sleeve F¹ is possible owing to the double tooth spaces between the teeth F⁹ and the similar spacing of the teeth H⁶ with which the teeth F⁹ are then in engagement. The engagement between these sets of teeth has become possible when the teeth H⁶ were able to pass in the axial direction through the "gate" between the teeth J³. The parts are now in the positions in which they are shown in Figure 16 with the teeth J³ of the locking ring, which has turned in the direction indicated by the arrow z, lying in the space H⁷ between the two sets of teeth H⁵ and H⁶ and thus behind the teeth H⁶. The teeth H⁶ now lie in relation to the teeth J³ as indicated by the radial line x—x in the upper view in Figure 16 so that the sleeve H cannot now be moved back to the left since the teeth J³ are in the way.

Following the relative positioning of the teeth H⁶ and J³ as indicated in Figure 15 the piston N³ and with it the actuating sleeve H will move quickly the piston L and the parts connected to it will also move rapidly and result in the over-speed gear wheel D being disconnected from the shaft G. There will be a moment now when neither the clutch member F² nor the clutch member E² will be engaged with the teeth of the shaft clutch member G² as the speed of this shaft is slowing down. As mentioned the clutch member F² cannot move axially enough to again engage its teeth with the teeth G⁴, but when the shaft ceases to over-run the clutch member E² this member will be caused by the action of the friction member E⁵ to turn on the part E³ of the sleeve E¹ and bring the teeth of the clutch member E² into engagement with the teeth G³ of the shaft clutch member G² whereby the lower gear ratio will become operative.

If a change is now to be made to the higher gear ratio, the valve O O¹ of the servomotor is moved into the position in which it is seen in Figure 17, and as the piston N³ with the valves N N¹ are in the positions in which they are shown in Figure 19 pressure liquid can pass through the port P³, cylinder Q¹ and port Q⁴ into the cylinder R¹ and there act on the piston L¹. This will move this piston to the right against the spring L³ and position the lever M and the sleeve valve M³ so as to admit liquid to the fluid flywheel and couple the over-speed gear wheel D to the shaft G. As the shaft speeds up beyond the speed at which it was driven at the lower gear ratio, the clutch member E² by the action of the friction member E⁵ will be caused to turn on the part E⁴ of the sleeve E¹ and consequently move in the axial direction thereby withdrawing its teeth from engagement with the teeth G³ of the shaft clutch member G². As the shaft speeds up further the action of the friction member F⁵ will cause the clutch member F² to turn on the part F³ of the sleeve F¹. This will turn the locking ring J in a direction opposite to that indicated by the arrow z in Figure 16 into the position indicated in Figure 15 where the "gate" constituted by the gaps J⁴ between the teeth J³ will be opened so as to allow the sleeve H to slide to the left into the position in which it is seen in Figure 15 and free the clutch member F² so that it can turn on the part E³ sufficiently for it to be moved far enough in the axial direction to bring the teeth F²ᵃ into engagement with the teeth G⁴ of the shaft clutch member. The sliding of the sleeve H to permit this engagement has to be effected by the action of the piston N³ which is at first in the position in which it is seen in Figure 19. The piston N³ is at this time pre-loaded by the pressure liquid in the cylinder Q¹, but the piston cannot move because the sleeve H is at first prevented from sliding to the left until the clutch member F² has turned the locking ring so as to open the "gate" J⁴. Directly this happens and the sleeve H is free to slide the piston N³ will move quickly to the right from the position in which it is seen in Figure 19 into the position in which it is shown in Figure 17. The valve N¹ will then have opened the cylinder R¹ to exhaust through the cylinder Q¹ and in consequence the spring L³ will move the piston L¹ and lever M and slide the sleeve valve M³ so as to allow the liquid to drain from the fluid flywheel and disconnect the gear wheel D from the shaft. The drive will now be taken up at the higher gear ratio as the shaft slows down and through the friction member F⁵ causes the clutch member F² to turn on the part F³ whereby it will be moved in the axial direction so as to bring the teeth F²ᵃ into engagement with the teeth G⁴ of the shaft clutch member.

It will be noted that at each gear change the pistons L L¹ reciprocate and move the lever M first to admit liquid to the fluid flywheel and then allow it to drain out whereby the shaft G is for a short time driven at the overspeed which brings about the movements in the axial direction of the clutch members E² and F² either while the shaft is speeding up or while it is slowing down after speeding up. The locking ring effectually prevents a jamming of the teeth of the clutch members which can not be moved to engage the teeth of the shaft clutch member until two members to be engaged are rotating at substantially the same speed. The servomotor described above as actuated by liquid under pressure prevents any gear being effected when the engine is not running if the pressure liquid is supplied from the engine lubricating system.

What I claim as my invention and desire to secure by Letters Patent is:

1. A variable speed transmission comprising in combination a driving shaft, a driven shaft, a plurality of gear wheels fast on the driving shaft and in constant mesh with gear wheels loose on the driven shaft one pair of said meshing gear wheels producing overdrive ratio, a fluid flywheel constituting means for coupling to the driven shaft one of the said gear wheels loose on that shaft whereby the shaft will be driven at said over speed, a clutch member fast on the said driven shaft and having two separate and oppositely directed sets of dog teeth, a sleeve rotatable on said driven shaft and carrying one of said loose gear wheels which is operative to drive said shaft at a low gear ratio, a clutch member on the said sleeve of this lower ratio gear wheel with a quickpitch thread connecting the clutch member to the sleeve so that relative rotation between the clutch member and the sleeve will cause the clutch member to move in the axial direction on the sleeve and thereby engage with or be disengaged from one of the sets of teeth on the said shaft clutch member, a second sleeve rotatable on the first sleeve and carrying one of the said loose gear wheels which is operative to drive the said shaft at a higher gear ratio, a clutch member on the said second sleeve with a quick pitch thread connecting the clutch member to the sleeve so that relative rotation between the clutch member and the sleeve will cause the clutch member to move in the axial direction on the sleeve and thereby engage with or be disengaged from the second set of teeth on the said shaft clutch member, an actuating sleeve adapted to rotate on the said driven shaft and slide in the axial direction relatively to the said shaft clutch member, means for thus sliding the actuating sleeve, teeth within the actuating sleeve which are constantly in sliding engagement with teeth on a guide sleeve mounted on the said second gear wheel sleeve and rotatable therewith, a locking ring rotatable on said second gear wheel sleeve and having teeth adapted to be engaged by the teeth within the said actuating sleeve, and an extension from the said clutch member on the said second gear wheel sleeve with splines slidably engaging splines on the said locking ring and having teeth adapted to be engaged by the said teeth within the actuating sleeve when this actuating sleeve is moved in the axial direction so as to cause teeth within it to first engage and then pass through the teeth on the said locking ring.

2. A variable speed transmission comprising the parts as set out in claim 1 in which the teeth within the said actuating sleeve are in two sets spaced apart in the axial direction with the teeth in both sets similar in that they are of single tooth width in the circumferential direction with double tooth spaces between them but in the axial direction the dimensions of the teeth in one set are greater than the dimensions of the teeth in the second set, the teeth on the said guide sleeve which are in engagement with teeth within the said actuating sleeve being of double width in the circumferential direction with single tooth spaces between them while the teeth on the said extension of the second clutch member are of single tooth width in the circumferential direction with double tooth spaces between them.

3. In combination with a variable speed transmission as set out in claim 1, servomotor apparatus for actuating the same including a casing in which are three cylinders of which the first has ports through which liquid under pressure can flow from and to the second cylinder and the second cylinder has ports through which liquid under pressure can flow from and to the third cylinder which has a port through which liquid under pressure can enter, a piston in the said first cylinder adapted to be moved in one direction by liquid under pressure admitted from the said second cylinder with a spring adapted to move the piston in the opposite direction, a connection between the said piston in the first cylinder and means for controlling the flow of liquid into and from the said fluid flywheel, a piston in the said second cylinder adapted to be moved in either direction by liquid under pressure admitted from the said third cylinder, this piston being connected to and moving two piston valves which respectively control the flow of pressure liquid through the said ports between the first and second cylinders, a connection between the said piston in the second cylinder and means for sliding the said actuating sleeve, and a piston valve in the said third cylinder with means for positioning it so as to determine the flow of pressure liquid through the said ports between the said second cylinder and the third cylinder.

4. A variable speed transmission comprising the parts as set out in claim 1 and including a lever through which sliding movement can be imparted to the said actuating sleeve for the purpose of either freeing the said second clutch member so that it may engage the said shaft clutch member or bringing into engagement the teeth within the actuating sleeve and those on the extension of the said second clutch member when this clutch member has been disengaged from the said shaft clutch member, a sleeve movable upon the said driven shaft and operative according to its position to control the flow of liquid into the said fluid coupling, a lever operative to slide the said controlling sleeve and determine the coupling through the fluid flywheel to the said driven shaft or disconnecting therefrom of the first said gear wheel through which the driven shaft can be driven at said overspeed, servomotor apparatus including a piston movable in one direction by fluid pressure and in the other direction by a spring and connected to the said lever, movement of which controls the flow of fluid into or from the said fluid flywheel, a second piston in a second cylinder movable in either direction by fluid pressure and connected to the said lever through which the said actuating sleeve is moved in one direction or the other relatively to the driven shaft, and a piston valve controlling the flow of liquid under pressure to and from said second cylinder, this pressure liquid also flowing through the second cylinder into the said first cylinder.

ADRIAN LESLIE CATFORD.

No references cited.